No. 873,328. PATENTED DEC. 10, 1907.
E. F. PRICE.
PROCESS OF PRODUCING SILICIDS.
APPLICATION FILED NOV. 14, 1905.
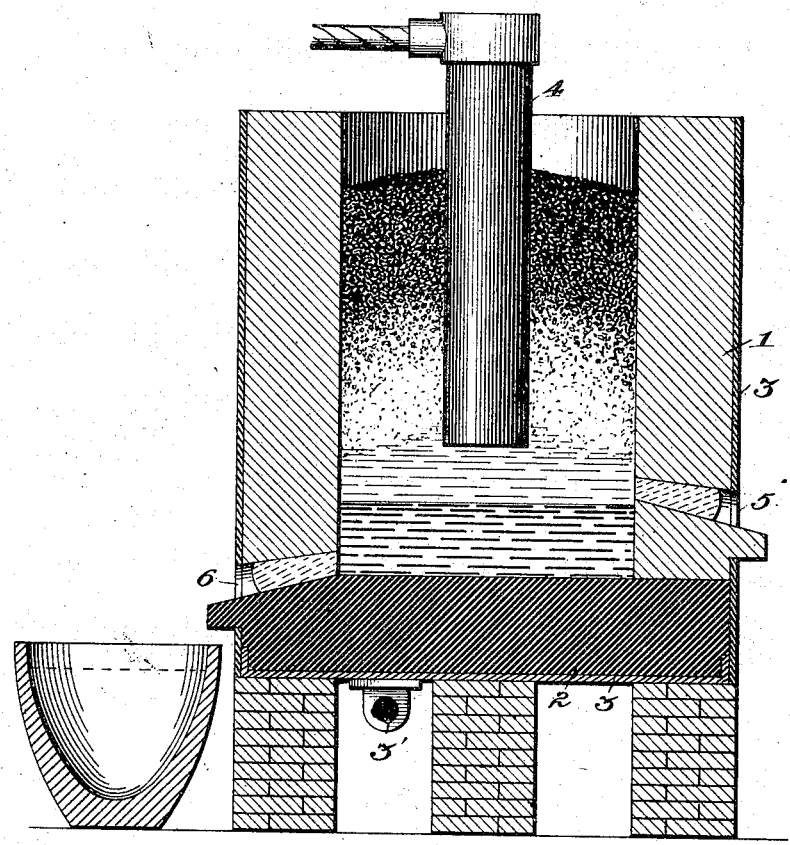
Witnesses:
G. E. Gruett
J. B. Hill
Inventor:
Edgar F. Price,
by Byrnes & Townsend,
Att'ys.

UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, A CORPORATION OF NEW YORK, TRUSTEE UNDER FIRST MORTGAGE.

PROCESS OF PRODUCING SILICIDS.

No. 873,328.　　　　Specification of Letters Patent.　　　　Patented Dec. 10, 1907.

Application filed November 14, 1905. Serial No. 287,347.

*To all whom it may concern:*

Be it known that I, EDGAR F. PRICE, a citizen of the United States, residing at Niagara Falls, in the county of Niagara and State of New York, have invented certain new and useful Improvements in Processes of Producing Silicids, of which the following is a specification.

In my U. S. Patent No. 790,391, granted May 23, 1905, I have described a process of smelting an electrically-conductive charge, specifically one containing chromite for the production of ferrochromium, which is stated to be also applicable to conductive mixtures of ores of two or more metals, for example silica and hematite.

The present invention relates to the production of ferrosilicon and other silicids high in silicon and contemplates the use of a charge containing such large proportion of silica as to make it of relatively low electrical conductivity. The charge also contains carbon in amount sufficient to not only effect reduction of the silica but also to protect the carbon electrodes and furnace lining from oxidation. A considerable body of the charge is maintained around the depending electrode or electrodes, and the reduction, withdrawal of the product and supply of fresh charge-materials are conducted as a continuous operation.

A suitable electric furnace is shown in the accompanying drawings, in which the figure is a vertical axial section through the tap-holes, with the depending electrode in elevation.

The furnace comprises sides 1 of refractory electrically non-conductive material such as carborundum, siloxicon or silica, or of carbon, and a hearth 2 of carbon, the sides and hearth being surrounded by a metal casing 3 having an electric terminal 3'. The carbon hearth constitutes one electrode. The other electrode is a depending carbon rod 4. Tap-holes 5, 6, for slag and metal, extend through the side walls at different heights. In employing this furnace to carry out the process, an arc is established between the depending electrode and the carbon hearth. The charge, for example a substantially non-conducting mixture of finely ground silica, iron ore and coke, the silica and carbon being in relatively large proportion, is then gradually fed into the furnace until in its normal working condition the depending electrode is embedded, as shown. As the reduction proceeds, molten ferrosilicon collects in the bottom of the furnace and is run out through the tap-hole 6. If the charge contains impurities, any resulting slag may be withdrawn through the tap-hole 5.

The use of a charge containing a large percentage of silica makes it possible to produce silicids containing fifty percent and upwards of silicon. Such a charge is also substantially a nonconductor of electricity, so that the working chamber of the furnace can be filled without shunting the current from the electrodes through the charge. The excess of carbon in the charge facilitates the reduction and protects the electrodes and the continuous mode of operation enables the efficiency of the furnace to be maintained at a high figure. Metallic iron may be substituted for iron ore in the charge.

The reference in the claims to an alloying metal, specifically iron, is to be understood as covering the metal *per se* or a compound which will yield the metal. It will be understood that two or more depending electrodes of the same polarity may be substituted for the one shown, or depending electrodes of different polarity may be employed, as well known in the art.

I claim:—

1. The process of producing silicids high in silicon, which consists in providing a charge comprising a silicon compound, an alloying metal and carbon, the silicon compound being in such porportion as to make the charge of relatively low electrical conductivity, establishing an arc within the charge, and surrounding the zone of reduction and protecting the electrodes from the oxidizing effect of the atmosphere by a considerable body of the charge, as set forth.

2. The process of producing ferrosilicon high in silicon, which consists in providing a charge of low electrical conductivity, comprising a silicon compound, iron and carbon, the silicon compound being in such proportion as to make the charge of relatively low electrical conductivity, establishing an arc within the charge, and surrounding the zone of reduction and protecting the electrodes from the oxidizing and cooling effect of the atmosphere by a considerable body of the charge, as set forth.

3. The process of producing silicids high in silicon, which consists in providing a charge of low electrical conductivity, comprising a silicon compound, an alloying metal and carbon, the silicon compound being in such proportion as to make the charge of relatively low electrical conductivity, establishing an arc within the charge, surrounding the zone of reduction and protecting the electrodes from the oxidizing and cooling effect of the atmosphere by a considerable body of the charge, and withdrawing the product and supplying the charge-mixture as required, as set forth.

4. The process of producing ferrosilicon high in silicon, which consists in providing a charge of low electrical conductivity, comprising a silicon compound, iron and carbon, the silicon compound being in such proportion as to make the charge of relatively low electrical conductivity, establishing an arc within the charge, surrounding the zone of reduction and protecting the electrodes from the oxidizing and cooling effect of the atmosphere by a considerable body of the charge, and withdrawing the product and supplying the charge-mixture as required, as set forth.

5. The process of producing silicids containing forty percent and upwards of silicon, which consists in providing a charge which is substantially a non-conductor of electricity, comprising a silicon compound, an alloying metal and carbon, establishing an arc within the charge, surrounding the zone of reduction and protecting the electrodes from the oxidizing and cooling effect of the atmosphere by a considerable body of the charge, and withdrawing the product and supplying the charge-mixture as required.

6. The process of producing ferrosilicon containing forty percent and upwards of silicon, which consists in providing a charge which is substantially a non-conductor of electricity, comprising a silicon compound, iron and carbon, establishing an arc within the charge, surrounding the zone of reduction and protecting the electrodes from the oxidizing and cooling effect of the atmosphere by a considerable body of the charge, and withdrawing the product and supplying the charge-mixture as required.

In testimony whereof, I affix my signature in presence of two witnesses.

EDGAR F. PRICE.

Witnesses:
G. E. Cox,
D. Burgess.